(12) United States Patent
Jouy et al.

(10) Patent No.: US 10,100,658 B2
(45) Date of Patent: Oct. 16, 2018

(54) TURBINE ENGINE IMPELLER

(71) Applicant: Snecma, Paris (FR)

(72) Inventors: Baptiste Jouy, Moissy-Cramayel (FR);
Bertrand Pellaton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 258 days.

(21) Appl. No.: 14/766,300

(22) PCT Filed: Feb. 6, 2014

(86) PCT No.: PCT/FR2014/050229
§ 371 (c)(1),
(2) Date: Aug. 6, 2015

(87) PCT Pub. No.: WO2014/122403
PCT Pub. Date: Aug. 14, 2014

(65) Prior Publication Data
US 2015/0361817 A1   Dec. 17, 2015

(30) Foreign Application Priority Data
Feb. 7, 2013 (FR) .................................... 13 51042

(51) Int. Cl.
*F01D 11/08* (2006.01)
*F01D 5/22* (2006.01)
(Continued)

(52) U.S. Cl.
CPC ............... *F01D 11/08* (2013.01); *F01D 5/02* (2013.01); *F01D 5/141* (2013.01); *F01D 5/225* (2013.01);
(Continued)

(58) Field of Classification Search
CPC . F01D 11/08; F01D 5/02; F01D 5/141; F05D 2220/36; F05D 2220/10; F05D 2240/55
See application file for complete search history.

(56) References Cited

U.S. PATENT DOCUMENTS 3,575,523 A * 4/1971 Gross, Jr. .................. F01D 5/20
                                                                415/171.1
5,154,581 A * 10/1992 Borufka .................. F01D 5/225
                                                                415/173.6
(Continued)

FOREIGN PATENT DOCUMENTS

| EP | 1 262 633 A1 | 12/2002 |
|---|---|---|
| GB | 2 451 568 A | 2/2009 |
| JP | 2005-127276 A | 5/2005 |

OTHER PUBLICATIONS

JP 2005127276 English Translation.*

*Primary Examiner* — Mark Laurenzi
*Assistant Examiner* — Shafiq Mian
(74) *Attorney, Agent, or Firm* — Blank Rome LLP

(57) ABSTRACT

An impeller for a turbine engine is disclosed, such as a turbojet engine or a turboprop engine of an aircraft, for rotating about an axis of rotation in a predetermined direction of rotation and for having a flow of gas passing therethrough, comprising a series of blades distributed circumferentially about the axis of rotation of the wheel, the radially external end of each blade comprising a heel supporting at least one radially external lip, extending circumferentially in an oblique direction relative to the radial plane perpendicular to the axis of rotation, the lip being angled circumferentially in the downstream direction in the aforementioned direction of rotation such as to enable a compression of the gases located upstream from the lip during the rotation of the impeller.

20 Claims, 3 Drawing Sheets

Figure 1:
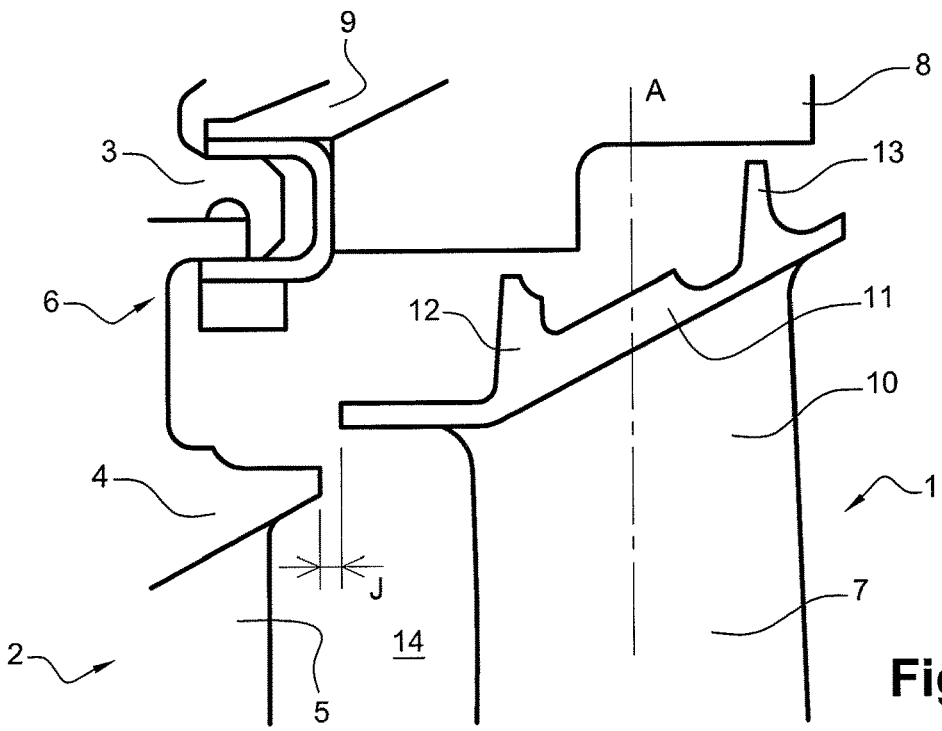

(51) Int. Cl.
  *F01D 5/02* (2006.01)
  *F01D 5/14* (2006.01)
(52) U.S. Cl.
  CPC ...... *F05D 2220/10* (2013.01); *F05D 2220/36* (2013.01); *F05D 2240/55* (2013.01); *F05D 2250/00* (2013.01); *F05D 2250/314* (2013.01); *Y02T 50/671* (2013.01); *Y02T 50/673* (2013.01)

(56) References Cited

U.S. PATENT DOCUMENTS

| | | | | |
|---|---|---|---|---|
| 5,971,710 A * | 10/1999 | Stauffer | ............... | B23P 6/002 415/118 |
| 6,102,655 A * | 8/2000 | Kreitmeier | ............ | F01D 11/08 415/173.3 |
| 6,402,474 B1 * | 6/2002 | Okuno | ............... | F01D 5/22 416/190 |
| 7,527,477 B2 * | 5/2009 | Norton | ............... | F01D 5/225 29/889.2 |
| 7,762,779 B2 * | 7/2010 | Zemitis | ............... | F01D 5/225 415/173.4 |
| 8,807,927 B2 * | 8/2014 | Babu | ............... | F01D 11/122 415/173.5 |
| 9,399,920 B2 * | 7/2016 | Miller | ............... | F01D 5/16 |
| 2004/0146404 A1 * | 7/2004 | Chantal | ............ | F01D 5/225 416/224 |
| 2005/0058539 A1 * | 3/2005 | Diakunchak | ............ | F01D 5/225 415/173.1 |
| 2005/0186079 A1 * | 8/2005 | Ingistov | ............ | F01D 5/225 416/223 R |
| 2006/0280610 A1 * | 12/2006 | Heyward | ............ | C22C 14/00 416/189 |
| 2009/0097979 A1 * | 4/2009 | Erdmann | ............ | F01D 5/225 416/179 |
| 2010/0024216 A1 * | 2/2010 | DeSander | ............ | F01D 5/187 29/889.721 |
| 2010/0272559 A1 * | 10/2010 | Propheter-Hinckley | ............ | F01D 11/005 415/173.1 |
| 2011/0193293 A1 * | 8/2011 | Mega | ............ | F01D 5/081 277/412 |
| 2013/0259691 A1 * | 10/2013 | Liu | ............ | F01D 5/225 416/179 |

\* cited by examiner

TURBINE ENGINE IMPELLER

The invention relates to an impeller for a turbine engine, such as a turbojet engine or a turboprop engine of an aircraft, intended to equip, in particular, a low-pressure turbine.

A turbine of such type generally comprises several impellers, each comprising a disk supporting, on the periphery thereof, blades which are regularly distributed around the axis of the disk.

Each blade comprises, at the radially external end thereof, a heel supporting lips intended to cooperate in operation with blocks made of abradable material attached to a casing of the turbine, so as to form seals of the labyrinth type. Document EP-A-1 262 633 discloses a turbine blade of this type.

The aerodynamic stream of the turbine is externally delimited by the heels of the rotor blades. However, the upstream and downstream ends of the heels of the wheel blades are axially separated by small clearances of nozzles located upstream and downstream of such wheel in operation, and gases from the stream may radially flow outside the heels through such clearances. The differences in pressure between upstream and downstream of a wheel create gas recirculation outside the stream, and the gases leaving the stream between the upstream ends of the heels of the blades of a wheel and the upstream nozzle circulate in the downstream direction outside the heels of the blades of such wheel are then re-injected into the stream between the downstream ends of the heels of the blades of the wheel and the downstream nozzle. Such gases expand without passing through the blades of the impeller blades, i.e. without passing through the working part of the turbine stage, which reduces the performances of the turbine.

The labyrinth seals formed by the lips and the blocks made of abradable material are intended to prevent or limit such phenomenon by opposing the flowing of gases axially in the downstream direction outside the rotor blades.

The gases leaving the stream between the upstream ends of the heels of the blades of a wheel and the upstream nozzle flow in the vicinity of the lips formed on the heels of the blades and are rotated and centrifuged by such lips.

In the current technique, the lips of the heel of a rotor blade are either straight, i.e. substantially parallel to the longitudinal axis of the blade or to a radial axis perpendicular to the longitudinal axis of the turbine, or angled relative to the longitudinal axis of the blade, in the upstream direction.

The advantage of the angled lips as compared to the straight lips is their better efficiency in terms of sealing since they return the centrifuged gases in the upstream direction, in a direction opposite the aforementioned gas recirculation.

However, the axial overall dimensions of such angled lips are relatively significant relative to those of straight lips.

In order to remedy such drawback, the patent application FR 2 977 909, in the name of the Applicant, provides for an impeller wherein each rotor blade comprises, at the radially external end thereof, a heel supporting at least one external lip comprising a radially internal part which extends from the heel outwards, substantially parallel to the longitudinal axis of the blade, and a radially external part which is angled relative to the longitudinal axis of the blade and which extends radially outwards in the direction of the leading edge of the blade.

Each lip thus comprises two parts having different orientations, a so-called straight internal part and a so-called angled external part, which makes it possible to combine the advantages of the straight and angled lips of the prior art (in terms of axial overall dimensions and sealing) while avoiding the disadvantages thereof. As a matter of fact, the straight part of each lip makes it possible to centrifuge the gases from the turbine, with such gases flowing radially from the inside to the outside along the lips. The angled part of each lip makes it possible to direct such gases in the upstream direction and therefore to prevent these from circulating axially in the downstream direction outside the heels of the blades. These lips have small axial overall dimensions since only the external parts thereof are angled. The advantage of this solution is to keep the performance gain of the angled lips while limiting the axial overall dimensions thereof.

However a need exists to further increase the performances of the low-pressure turbine, or more generally of the impellers of the turbine engine.

The invention more particularly aims at providing a simple, efficient and cost-effective solution to this problem.

For this purpose, it provides an impeller for a turbine engine, such as a turbojet engine or a turboprop engine of an aircraft, intended for rotating about an axis of rotation in a predetermined direction of rotation and for having a flow of gas passing therethrough, comprising a series of blades distributed circumferentially about the axis of rotation of the wheel, with each blade comprising an upstream edge and a downstream edge relative to the gas flow direction, the radially external end of each blade comprising a heel supporting at least one radially external lip, characterized in that the lip extends circumferentially in an oblique direction relative to the radial plane perpendicular to the axis of rotation, the lip being angled circumferentially in the downstream direction in the aforementioned direction of rotation such as to enable a compression of the gases located upstream from the lip during the rotation of the impeller.

The gases upstream of the lip are thus slightly compressed in operation so as to avoid their circulating axially in the downstream direction outside the blade heels. The performances of the turbine are thus enhanced. The overall dimensions of such a lip are also limited, as compared to the angled lips of the prior art.

It should be noted that a part of the power is sampled from the turbine to compress the gases upstream from the lip. However, tests revealed that such lost power is greatly compensated for by the performance gain obtained while avoiding the gases flowing axially in the downstream direction outside the lip.

According to one characteristic of the invention, each heel comprises several external lips extending circumferentially in oblique directions relative to the radial plane perpendicular to the axis of rotation.

According to one embodiment, the angles of inclination of the lips relative to said radial plane are identical.

According to another embodiment, the angles of inclination of at least two lips relative to said radial plane are different.

The angle of inclination of at least one lip relative to said radial plane preferably ranges from 20 to 45°.

Such an angle of inclination is a good compromise between the power sampled from the turbine to compress the gases upstream of the lip and the performance gain obtained while avoiding the gases flowing axially in the downstream direction outside the heel.

Besides, the lip comprises a radially internal part which extends along a first plane which is oblique relative to said radial plane, and a radially external part which extends along a second plane, which is angled in the downstream direction and radially in the outward direction relative to the first plane.

The lip thus comprises two parts having different orientations, an internal part extending in the first plane and an external part extending in the second plane. The internal part of the lip makes it possible to centrifuge the gases from the turbine (in addition to compressing these as described above), with such gases flowing radially from the inside to the outside along the lip. The external part of the lip still reinforces the discharge of the gases in the upstream direction, so as to prevent these from circulating axially in the downstream direction outside the heels of the blades.

In combination with the embodiments described above, it is provided to bend the lips in the circumferential direction around at least one axis of rotation extending in a radial direction and located upstream of the lips.

The ends of the lips remain circumferentially shifted in the downstream direction, in the direction of rotation. Instead of extending straight between these ends, the lips are curved circumferentially.

The downstream ends of the lips, which are also located ahead of the lips when considering the direction of the rotational movement of the latter, are preferably substantially oriented tangentially to the circumferential direction, so as to penetrate the air flow without any disturbance.

On the contrary, the upstream ends of the lips, which are also located behind the lips when considering the direction of the rotational movement of the latter, are preferably substantially oriented tangentially to the circumferential direction, so as to reject the air flow circulating along the lips upon the rotation in the upstream direction.

The central parts of the lips which connect the downstream end and the upstream end thereof, the appearance of which is defined hereunder, are thus curved so that the flow is directed along the lips between the above-mentioned ends with as little disturbance as possible.

The radius of curvature may vary along the same lip, or between the various lips provided, from a radius of curvature for instance equal to 15% of the distance separating the downstream end and the upstream end of the lip, at the downstream end thereof, to a radius of curvature for instance equal to 130% of the distance separating the downstream end and upstream end of the lip, at the upstream end thereof.

The invention also relates to a low-pressure turbine for a turbine engine, such as a turbojet or turboprop of an aircraft, characterized in that it comprises several stages, each comprising an impeller of the above type.

The invention also relates to a turbine engine, such as a turbojet or turboprop of an aircraft, characterized in that it comprises a low-pressure turbine of the above type.

Figure 2:
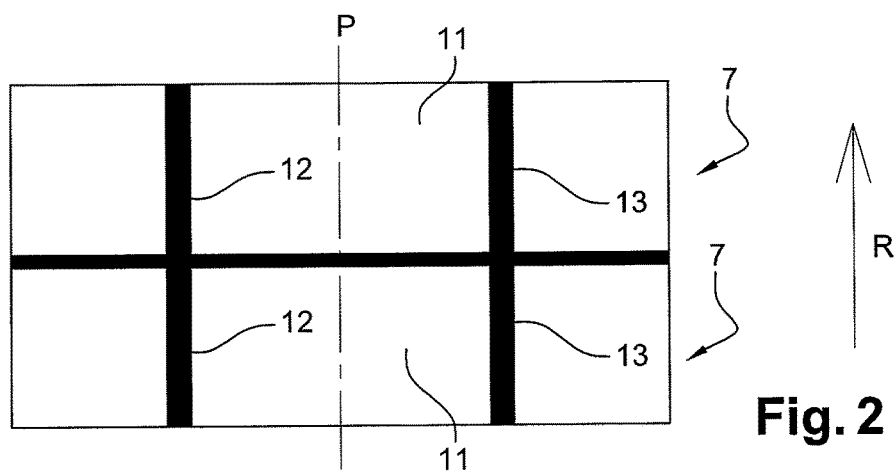
Figure 3:
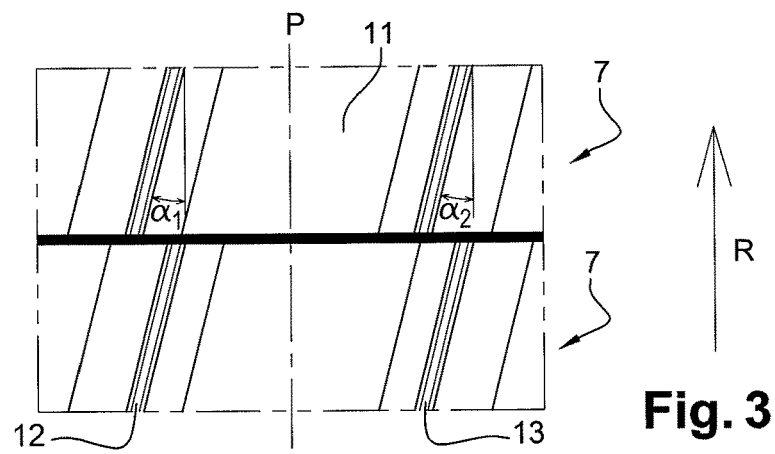
Figure 4:
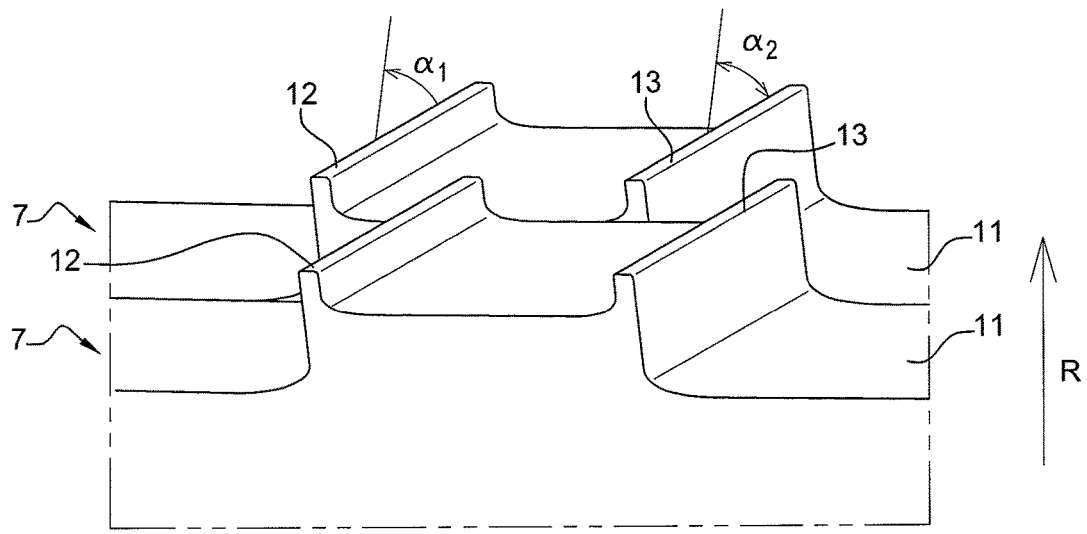
Figure 5:
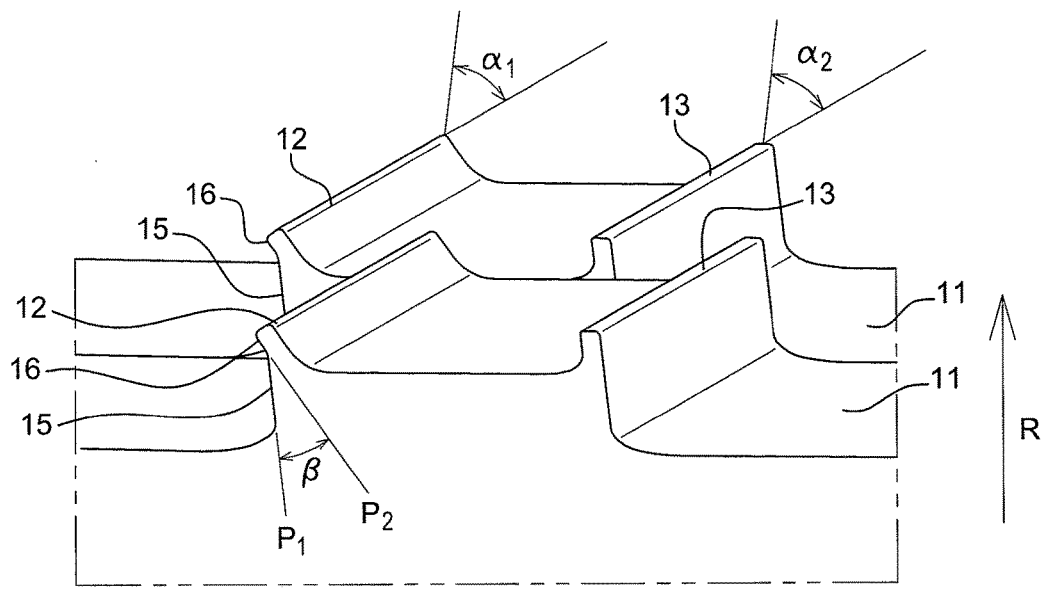
Figure 6:
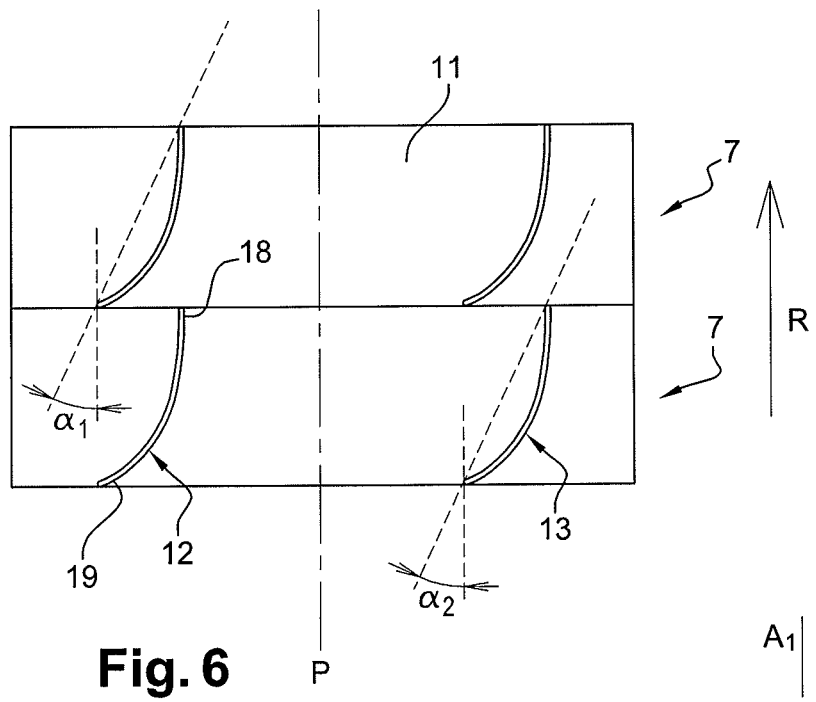
Figure 7:
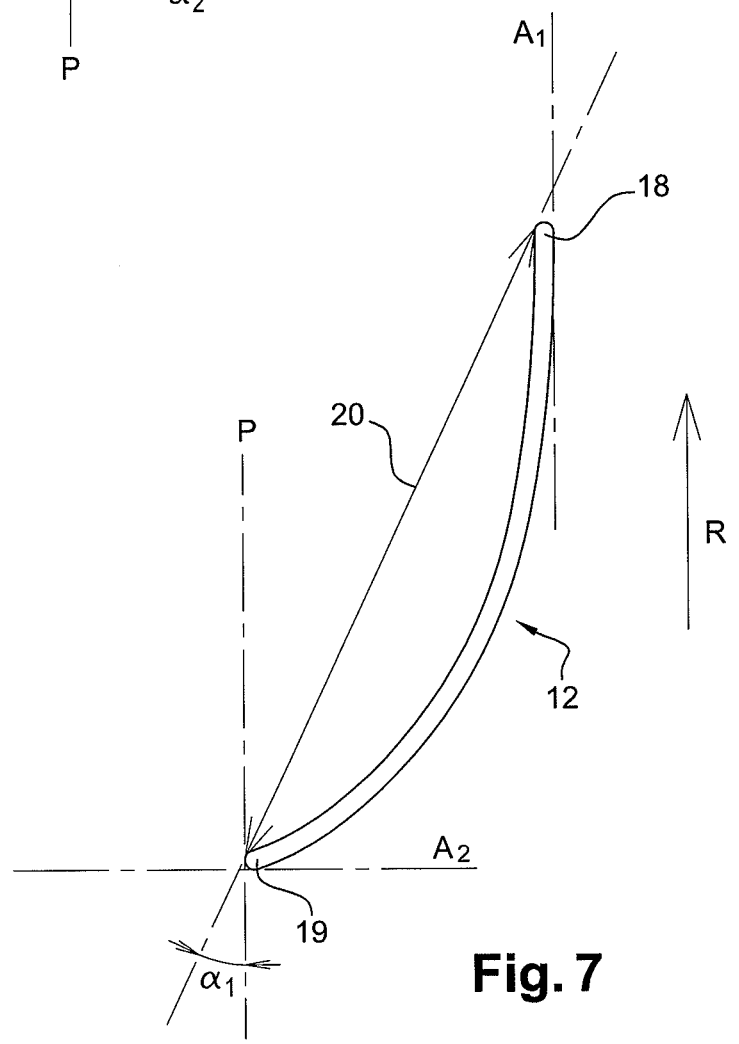

The invention will be better understood, and other details, features and advantages of the invention will appear upon reading the following description given by way of a non restrictive example while referring to the appended drawings wherein:

FIG. 1 is an axial cross-sectional view of a part of a low-pressure turbine of the prior art, FIG. 2 is a schematic view illustrating two blades of the turbine of FIG. 1, as seen radially from outside, FIG. 3 is a view corresponding to FIG. 2, showing one embodiment of the invention, FIG. 4 is a perspective view of a part of the heels of the blades of FIG. 3, FIG. 5 is a view corresponding to FIG. 4, illustrating another embodiment of the invention, FIG. 6 is a view corresponding to FIG. 3, illustrating a last embodiment of the invention, FIG. 7 is a schematic view of a lip shown in FIG. 6.

Reference is first made to FIG. 1 which shows a low-pressure turbine of a turbine engine such as a turbojet or a turboprop engine according to the prior art, with such turbine comprising several stages each having a mobile impeller 1 and a nozzle 2 which is mounted downstream of the wheel and supported by an external housing 3 of the turbine. It should be noted that FIG. 1 only shows the nozzle 2 of the stage preceding that of the impeller 1 and is thus positioned upstream of the wheel 1.

Each nozzle 2 conventionally comprises two coaxial annular, respectively internal (not visible) and external 4 platforms, between which an annular array of vanes 5 extends, with the external platform 4 comprising means 6 for attachment to the housing 3 of the turbine.

Each mobile wheel 1 comprises a disk (not visible) on the external periphery of which parallel grooves are formed wherein the blade roots of the rotor 7 are engaged, with the grooves of the disk having a shape matching that of the blade roots, e.g. of the dovetail type.

Each mobile wheel 1 is surrounded externally with a small clearance by a cylindrical envelope formed of blocks made of abradable material 8 attached to the ring sectors 9 hanging circumferentially on the housing 3 of the turbine.

Each rotor blade 7 comprises a vane 10 which is connected at its radially internal end by a platform to the blade root (not visible), and at its radially external end to a heel 11 supporting the lips 12, 13 extending radially outwards and intended to cooperate with the blocks made of abradable material 8 to form a labyrinth type seal.

The platforms and the heels of the nozzles 5 and the mobile wheels of the turbine 1 define together the gas flow stream 14 from a combustion chamber of the turbine engine.

The upstream ends of the heels 11 of the blades 7 of a mobile wheel 1 are axially spaced by a small clearance J of the downstream ends of the external platform 4 of the nozzle 3 located upstream of such mobile wheel 1. In operation, a part of the gases flowing in the stream 14 can escape from the stream 14 by passing radially outwards through the clearance J. The lips 12, 13 cooperate with the blocks made of abradable material 8 so as to limit or prevent the circulation of such gases in the downstream direction radially outside the heels 11 of the blades 7 of the mobile wheel 1.

In the present technique, the lips 12, 13 are generally straight, i.e. extend in a radial plane substantially parallel to the longitudinal axis A of the blade or to a radial axis perpendicular to the longitudinal axis of the turbine.

It has been demonstrated that such lips 12, 13 do not ensure sufficient sealing between the heels 11 of the blades 7 and the blocks made of abradable material 8, so that a non negligible flow of gas bypasses the stream 14 by passing between the upstream ends of the heels 11 of the blades 7 and the upstream nozzle 4, and then outside the heels 11 of the blades 7 of the mobile wheel 1, before being re-injected into the stream 14 by passing between the downstream ends of the heels 11 of the blades 7 of the mobile wheel 1 and the downstream nozzle 2. Such gases expand without going through the vanes 10 of the blades 7 of the mobile wheel 1, i.e. without going into the working part of the matching turbine stage, which reduces the performances of the turbine.

FIGS. 3 and 4 illustrate a first embodiment of the invention aiming at remedying such drawback. In this embodiment, each lip 12, 13 extends circumferentially in an oblique direction relative to the radial plane P perpendicular to the axis of rotation of the wheel 1, with each lip 12, 13 being angled circumferentially in the downstream direction in the direction of rotation R so as to enable a compression of the gases located upstream from the lip 12, 13 during the rotation of the impeller 1.

In the case of FIGS. 3 and 4, the respective angles of inclination $_1$ and $_2$ of the lips 12, 13 relative to the radial plane P mentioned above are identical and range from 20 to 45°. Of course, the lips 12, 13 may have different angles of inclination $_1$ and $_2$. Similarly, only one of the lips 12, 13, for instance the upstream lip 12, may be angled relative to the above radial plane P. The heel 11 may also comprise only one lip.

In all cases, the lips 12, 13, thus angled relative to the radial plane P make it possible, in operation, to compress the gases located upstream in order to significantly limit the gas flow bypassing the stream 14, and thus to increase the performances of the turbine.

FIG. 5 illustrates a second embodiment of the invention wherein each lip 12, 13 comprises a radially internal part 15 extending along a first plane P1, obliquely to the radial plane P perpendicular to the axis of rotation and circumferentially angled in the downstream direction, in the direction of rotation R. Each lip 12, 13 further comprises a radially external part 16 extending along a second plane P2 angled in the upstream direction and radially from the inside to the outside, relative to the first plane P1.

Each lip 12, 13 thus comprises two parts having different orientations, an internal part 15 extending along the first plane P1 and an external part 16 extending along the second plane P2. The internal part 15 of each lip 12, 13 makes it possible to centrifuge the gases from the turbine (in addition to compressing these as described above), with such gases flowing radially from the inside to the outside along the lip 12, 13. The external part 16 of each lip 12, 13 further enhances the discharge of the gases in the upstream direction, by centrifugation, so to prevent these from circulating axially in the downstream direction outside the heels 11 of the blades 7.

This embodiment thus combines the effects of the compression of gases upstream of the lips 12, 13 and the discharge of gases in the upstream direction by centrifugation, so as to further reduce the gas flow bypassing the stream 14 of the turbine.

The first plane P1 may be angled, as above, by an angle $_1$ or $_2$ ranging from 20 to 45° relative to the radial plane P perpendicular to the axis of rotation. Besides, the second plane P2 may be angled by an angle ranging from 25 to 35° relative to the first plane P1.

In this embodiment, the height or radial dimension of the internal part 15 of the lips 12, 13 represents about 40 to 60% of the height or total radial dimension of the lips 12, 13. The height or radial dimension of the internal part 15 of the upstream lip 12 may be optimised to determine and precisely position the centre of the heel 11. In the case where such height is increased, the weight of the upstream lip 12 is increased and the centre of gravity of the heel 11 is shifted in the upstream direction. In the case where such height is decreased, the weight of the upstream lip 12 is decreased and the centre of gravity of the heel 11 is shifted in the downstream direction.

Of course, only one of the two lips 12, 13, preferably the upstream lip 12, may comprise two angled parts 15, 16 with respect to each other by an angle of. The heel 11 of FIG. 5 may also comprise only one lip.

In combination with the embodiments described above, and as illustrated in FIGS. 6 and 7, it is provided to bend the lips 12, 13 in the circumferential direction, around at least one axis of rotation extending in a radial direction and located upstream of the lips 12, 13.

The ends of the lips 12, 13 remain shifted circumferentially in the downstream direction in the direction of rotation R. Instead of extending straight between the ends, the lips are thus circumferentially curved.

More precisely, the downstream ends 18 of the lips, which are also located ahead of the lips when considering the direction of the rotational movement of the latter, are substantially oriented tangentially to the circumferential direction $A_1$, so as to penetrate the air flow without any disturbance.

On the contrary, the upstream ends 19 of the lips, which are also located behind the lips when considering the direction of the rotational movement of the latter, are substantially oriented tangentially to the circumferential direction $A_2$, so as to reject the air flow circulating along the lips upon the rotation in the upstream direction.

The central parts of the lips 12, 13 which connect the downstream end 18 and the upstream end 19 thereof, the appearance of which is defined hereunder, are thus curved so that the flow is directed along the lips between the above-mentioned ends with as little disturbance as possible.

The radius of curvature may vary along the same lip, or between the various lips provided, from a radius of curvature for instance equal to 130% of the distance 20 separating the downstream end and the upstream end of the lip, at the downstream end 18 thereof, to a radius of curvature for instance equal to 15% of the distance 20 separating the downstream end and upstream end of the lip, at the upstream end 19 thereof.

The radius of curvature of a lip 12, 13 may, for instance, gradually decrease between the downstream end 18 and the upstream end 19 thereof.

Eventually, the invention may also more generally apply to any type of turbine or rotor of a turbine engine, such as a turbojet engine or a turboprop engine of an aircraft.

The invention claimed is:

1. An impeller for a turbine engine for rotating about an axis of rotation in a predetermined direction of rotation and for having a flow of gas passing therethrough and moving in a direction from upstream to downstream, comprising a series of blades distributed circumferentially about the axis of rotation of a wheel, with each blade comprising an upstream edge and a downstream edge relative to a gas flow direction, with the blades formed and positioned to be driven in the predetermined direction of rotation when the flow of gas passes therethrough in the downstream direction, with a radially external end of each blade comprising a heel supporting at least one radially external lip having an upstream end and a downstream end, characterized in that the at least one radially external lip extends circumferentially in an oblique direction relative to a radial plane perpendicular to the axis of rotation, wherein the at least one radially external lip is angled so that the upstream end of the at least one radially external lip is circumferentially offset relative to the downstream end of the at least one radially external lip in the predetermined direction of rotation in order to enable a compression of gases located upstream from the at least one radially external lip during a rotation of the impeller.

2. The impeller according to claim 1, wherein each heel comprises a plurality of radially external lips extending circumferentially in oblique directions relative to the radial plane perpendicular to the axis of rotation.

3. The impeller according to claim 2, wherein angles of inclination of the plurality of radially external lips relative to said radial plane are identical.

4. The impeller according to claim 2, wherein angles of inclination of the plurality of radially external lips relative to said radial plane are different.

5. The impeller according to claim 1, wherein an angle of inclination of the at least one radially external lip relative to said radial plane ranges from 20 to 45°.

6. The impeller according to claim 1, wherein the at least one radially external lip comprises a radially internal part which extends along a first plane which is oblique relative to said radial plane, and a radially external part which extends along a second plane, angled in the downstream direction and radially in the outward direction relative to the first plane.

7. The impeller according to claim 1, wherein the at least one radially external lip is curved in a circumferential direction, around at least one axis of rotation extending in a radial direction and positioned upstream from the at least one radially external lip.

8. The impeller according to claim 7, wherein the downstream end of the radially external lip is oriented substantially tangentially relative to a circumferential direction of the impeller, and the upstream end of the at least one radially external lip is oriented substantially tangentially relative to the axial direction of the impeller.

9. A low-pressure turbine, comprising several stages each having an impeller comprising a series of blades distributed circumferentially about an axis of rotation of a wheel, with each blade comprising an upstream edge and a downstream edge relative to a gas flow direction, the gas flow direction moving in a direction from upstream to downstream, with the blades formed and positioned to be driven in a predetermined direction of rotation when a flow of gas passes therethrough in the downstream direction, with a radially external end of each blade comprising a heel supporting at least one radially external lip having an upstream end and a downstream end, characterized in that the at least one radially external lip extends circumferentially in an oblique direction relative to a radial plane perpendicular to the axis of rotation, wherein the at least one radially external lip is angled so that the upstream end of the at least one radially external lip is circumferentially offset relative to the downstream end of the at least one radially external lip in the predetermined direction of rotation in order to enable a compression of gases located upstream from the at least one radially external lip during a rotation of the impeller.

10. A turbine engine, comprising:
 a low-pressure turbine, wherein the low-pressure turbine has several stages each having an impeller comprising a series of blades distributed circumferentially about an axis of rotation of a wheel, with each blade comprising an upstream edge and a downstream edge relative to a gas flow direction, with the blades formed and positioned to be driven in a predetermined direction of rotation when a flow of gas passes therethrough in a direction from upstream to downstream, with a radially external end of each blade comprising a heel supporting at least one radially external lip having an upstream end and a downstream end, characterized in that the at least one radially external lip extends circumferentially in an oblique direction relative to a radial plane perpendicular to the axis of rotation, wherein the at least one radially external lip is angled so that the upstream end of the at least one radially external lip is circumferentially offset relative to the downstream end of the at least one radially external lip in the predetermined direction of rotation in order to enable a compression of gases located upstream from the at least one radially external lip during a rotation of the impeller.

11. The low-pressure turbine according to claim 9, wherein each heel comprises a plurality of radially external lips extending circumferentially in oblique directions relative to the radial plane perpendicular to the axis of rotation.

12. The low-pressure turbine according to claim 11, wherein angles of inclination of the plurality of radially external lips relative to said radial plane are identical.

13. The low-pressure turbine according to claim 11, wherein angles of inclination of the plurality of radially external lips relative to said radial plane are different.

14. The low-pressure turbine according to claim 9, wherein the at least one radially external lip comprises a radially internal part which extends along a first plane which is oblique relative to said radial plane, and a radially external part which extends along a second plane, angled in the downstream direction and radially in the outward direction relative to the first plane.

15. The low-pressure turbine according to claim 9, wherein the at least one radially external lip is curved in the circumferential direction, around at least one axis of rotation extending in a radial direction and positioned upstream from the at least one radially external lip.

16. The turbine engine according to claim 10, wherein each heel comprises a plurality of radially external lips extending circumferentially in oblique directions relative to the radial plane perpendicular to the axis of rotation.

17. The turbine engine according to claim 16, wherein angles of inclination of the plurality of radially external lips relative to said radial plane are identical.

18. The turbine engine according to claim 16, wherein angles of inclination of the plurality of radially external lips relative to said radial plane are different.

19. The turbine engine according to claim 10, wherein the at least one radially external lip comprises a radially internal part which extends along a first plane which is oblique relative to said radial plane, and a radially external part which extends along a second plane, angled in the downstream direction and radially in the outward direction relative to the first plane.

20. The turbine engine according to claim 10, wherein the at least one radially external lip is curved in the circumferential direction, around at least one axis of rotation extending in a radial direction and positioned upstream from the at least one radially external lip.

* * * * *